United States Patent
Dinel et al.

(10) Patent No.: US 12,103,693 B2
(45) Date of Patent: Oct. 1, 2024

(54) SYSTEM FOR MANAGING ENERGY FOR AN AIRCRAFT WITH A HYBRID POWER SOURCE COMPRISING AT LEAST ONE RECHARGEABLE ELECTRICITY SOURCE AND ONE ELECTRICITY GENERATING SOURCE

(71) Applicant: ASCENDANCE FLIGHT TECHNOLOGIES, Toulouse (FR)

(72) Inventors: Clément Dinel, Toulouse (FR); Marion Marduel, Toulouse (FR)

(73) Assignee: ASCENDANCE FLIGHT TECHNOLOGIES, Toulouse (FR)

( * ) Notice: Subject to any disclaimer, the term of this patent is extended or adjusted under 35 U.S.C. 154(b) by 0 days.

(21) Appl. No.: 18/290,149

(22) PCT Filed: May 10, 2022

(86) PCT No.: PCT/FR2022/050892
§ 371 (c)(1),
(2) Date: Nov. 9, 2023

(87) PCT Pub. No.: WO2022/238653
PCT Pub. Date: Nov. 17, 2022

(65) Prior Publication Data
US 2024/0262521 A1  Aug. 8, 2024

(30) Foreign Application Priority Data
May 10, 2021  (FR) .................................. 2104948

(51) Int. Cl.
*B64D 31/18*  (2024.01)
*B60L 50/61*  (2019.01)
*B64D 27/33*  (2024.01)

(52) U.S. Cl.
CPC .............. *B64D 31/18* (2024.01); *B60L 50/61* (2019.02); *B64D 27/33* (2024.01); *B60L 2200/10* (2013.01); *B64D 2221/00* (2013.01)

(58) Field of Classification Search
CPC .............. B64D 27/026; B64D 2221/00; B64D 31/00; B64D 31/18; B64D 27/33; B60L 2200/10; B60L 50/61
See application file for complete search history.

(56) References Cited

U.S. PATENT DOCUMENTS 5,847,520 A * 12/1998 Theurillat ............... B60L 50/51
                                                          903/903
9,932,118 B2 * 4/2018 Bak ........................ B64D 35/02
(Continued)

FOREIGN PATENT DOCUMENTS

CN          109094790 A      12/2018
EP           3116781 A1       1/2017
(Continued)

OTHER PUBLICATIONS

International Search Report (PCT/ISA/210) with machine-generated English translation, dated on Aug. 1, 2022, by the European Patent Office as the International Searching Authority for International Application No. (PCT/FR2022/050892) (6 pages).
(Continued)

*Primary Examiner* — Thai T Dinh
(74) *Attorney, Agent, or Firm* — Boone IP Law (57) ABSTRACT

A power management system for an aircraft with a hybrid power source comprises a rechargeable electricity source and an electricity generating source, a detector determining status data of the elements of the aircraft power consumption electrical circuit, and power data relating to the instantaneous electrical power demanded by the aircraft and/or the charging status of the rechargeable electricity sources, an automaton receiving the power data from the detector and
(Continued)

determining a control status for the power sources, an adapter determining a backup electrical configuration when the status data indicate a failure, a controller determining an electrical control for the rechargeable electrical source and the electrical generating source based on the instantaneous electrical power demanded, and a switch emitting commands to the switches of the aircraft power consumption electrical circuit to implement a nominal electrical configuration, or, a backup electrical configuration for the adapter in case of receipt thereof.

6 Claims, 4 Drawing Sheets

(56) References Cited

U.S. PATENT DOCUMENTS

| | | | |
|---|---|---|---|
| 11,059,598 B2* | 7/2021 | Arkus | ............ B64C 1/063 |
| 11,273,920 B2 | 3/2022 | Gazzino et al. | |
| 2008/0184906 A1* | 8/2008 | Kejha | ............ B64U 50/19 |
| | | | 102/374 |
| 2011/0178648 A1 | 7/2011 | Calvignac et al. | |
| 2017/0327219 A1* | 11/2017 | Alber | ............ B64D 27/24 |

FOREIGN PATENT DOCUMENTS

| | | |
|---|---|---|
| FR | 3084318 A1 | 6/2020 |
| WO | 2015195856 A1 | 12/2015 |
| WO | 2020044134 A1 | 3/2020 |
| WO | 2021064395 A2 | 4/2021 |

OTHER PUBLICATIONS

Written Opinion (PCT/ISA/237) with machine-generated English translation, mailed Nov. 17, 2022, by the European Patent Office as the International Searching Authority for International Application No. (PCT/FR2022/050892) (11 pages).

* cited by examiner

SYSTEM FOR MANAGING ENERGY FOR AN AIRCRAFT WITH A HYBRID POWER SOURCE COMPRISING AT LEAST ONE RECHARGEABLE ELECTRICITY SOURCE AND ONE ELECTRICITY GENERATING SOURCE

The invention relates to the field of aircraft and more particularly to the field of energy management systems for an aircraft with a hybrid power source comprising at least one rechargeable electricity source and one electricity generating source.

The aeronautical industry currently faces numerous changes, in part in connection with the evolution of the environment-related requirements, and in part in connection with the development of electrically-propelled aircraft. In particular, the VTOL field (standing for Vertical Take-Off and Landing) is particularly dynamic because it offers quite interesting prospects as a new transportation means.

VTOLs are a very old field (they have been developed since 1921), but their electrification has given rise to many new proposed solutions, as well as regulations. In particular, the last regulations (cf. for example SC-VTOL-01 SPECIAL CONDITION Vertical Take-Off and Landing (VTOL) Aircraft; issued on Jul. 2, 2019) require redundancy of all of the systems related to the propulsion and to the flight, to the motors, to the power sources passing throughout the entire electrical system to allow ensuring continuity of the flight (referred to as a "continued safe flight and landing") and not only an emergency landing following the occurrence of a failure. This is also referred to as "one-fail-safe", i.e. "which is tolerant to a simple failure".

These regulations have considerably encouraged the development of solutions involving redundancy, both at the level of the rechargeable electricity sources, as well as at the electricity generating sources, but also at the level of the motors and rotors.

The consequence of this development is a very important complexification of the control systems. Conventionally, three control systems could take place in an aircraft with a hybrid power source:
- a flight management system (so-called "flight management system" or FMS), which manages the flight parameters according to the external conditions and of the flight controls, and in particular determines the instantaneous electrical power demanded by the motors and/or the rotors and controls them accordingly, but optionally the other parameters like the orientations of the flaps, of the stabilizers, ailerons, etc.,
- a battery management system (so-called "Battery Management System", or BMS), which is intended to optimize the management of the electrical energy in the rechargeable electricity sources, and
- an energy management system (so-called "Energy management system" or EMS), to manage the supply of electrical power to the consumers, in accordance with the requests of the FMS (as could be done by a FADEC, standing for "Full Authority Digital Engine Control" in the case of a conventional thermal propulsion system).

These three systems could coexist, but it might also happen that the BMS and the EMS are combined, for example when the BMS or the EMS is extremely simplified.

In order to face the challenge that the redundancy management represents, the optimization of the electrical consumption, specific controllers have been developed, which are grafted next to the FMS, BMS and EMS. The addition of the one-fail safe management further complicates the situation.

Given the reliability requirements of the aeronautical industry, these problems are conventionally managed by exhaustively listing all possible cases for each problem (energy management, redundancy/failure management), and a tree which allows reproducing this completeness for each problem. This is for example the case of the document CN 109094790.

However, as progress goes on, the trees become increasingly complex to generate and manage, and in turn become risk sources. In addition, as soon as one element of the architecture changes, the trees become obsolete, and one should restart from zero. Other solutions seek to manage according to the flight phases, like the document FR 3 084 318 or the document US 2011/0178648. Yet herein again, these approaches are lacunary and barely adaptable.

For this reason, to date, there is no system that allows efficiently managing the power within a hybrid aircraft, while allowing controlling the one-fail-safe problems.

The invention aims to improve the situation. To this end, it provides an energy management system for an aircraft with a hybrid power source comprising at least one rechargeable electricity source and an electricity generating source. This system comprises a detector arranged to determine, on the one hand, status data indicating a status of the elements of the power consumption electrical circuit of the aircraft controlled by the energy management system, and on the other hand power data relating to the instantaneous electrical power demanded by the aircraft and/or the charging status of the rechargeable electricity sources of the aircraft, an automaton arranged to receive the power data from the detector and to determine a control status of the power sources.

The automaton comprising at least three statuses in the group comprising:
- a buffer status in which the demanded instantaneous electrical power is lower than the capacity of the at least one electricity generating source and is supplied thereby,
- a charging status in which the demanded instantaneous electrical power is lower than the capacity of the at least one electricity generating source and is entirely supplied by the at least one electricity generating source, and wherein the one or more electricity generating source produces a surplus of power used to recharge the at least one rechargeable electricity source, and
- a turbo status in which the demanded instantaneous electrical power is higher than the capacity of the at least one electricity generating source, and where the at least one rechargeable electricity source supplies the complement required to reach the demanded instantaneous electrical power.

The system also comprises an adapter arranged to receive the status data and to determine a backup electrical configuration when the status data indicate a failure, a controller arranged to receive the status information of the automaton and to determine an electrical control for the at least one rechargeable electricity source and the at least one electricity generating source according to the demanded instantaneous electrical power, and a switch arranged to emit controls to the switches of the power consumption electrical circuit of the aircraft controlled by the energy management system to implement a nominal electrical configuration, or, in case of reception of a backup electrical configuration of the adapter, this backup electrical configuration.

This energy management system is particularly advantageous because it allows introducing a functional and simplified management. Indeed, the automaton/adapter decoupling allows managing both the power and taking advantage of the potential redundancy of the architecture while managing the one-fail-safe. Another advantage of the architecture of this energy management system is that it is "agnostic" to the architecture of the hybrid aircraft. Indeed, by decoupling the energy management and the management of the configuration of the circuit to implement the electrical consumption, the energy management system becomes capable of managing any degree of electrical or mechanical redundancy of the aircraft, since all it needs is to modify the settings of the adapter. Hence, this energy management system has great expandability and can be quickly deployed on many hybrid aircrafts with quite various architectures.

According to various embodiments, the invention may have one or more of the following features:
- the controller is arranged to use the rechargeable electricity sources when the automaton is in the buffer status, during a transition during which the power delivered by the at least one electricity generating source increases up to the demanded instantaneous electrical power,
- the automaton is initialized with the buffer status, and presents the following transition rules:
- transition from the buffer status or the charging status into the turbo status when the demanded instantaneous electrical power is higher than the capacity of the at least one electricity generating source,
- transition from the turbo status into the buffer status when the demanded instantaneous electrical power is lower than the capacity of the at least one electricity generating source,
- transition from the buffer status into the charging status when the demanded instantaneous electrical power is lower than the capacity of the at least one electricity generating source and one or more rechargeable electricity source presents a charging status lower than a fully-charged threshold, and
- transition from the charging status into the buffer status when the demanded instantaneous electrical power is lower than the capacity of the at least one electricity generating source and one or more rechargeable electricity source presents a charging status equal to a fully-charged threshold,
- the automaton further comprises a silent status in which the at least one electrical power source is deactivated,
- the automaton further has the following transition rules:
- transition from the buffer, charging or turbo status into the silent status when a silent mode control is received by the detector,
- transition from the silent status into the buffer status when the silent mode control is deactivated,
- the controller is arranged to receive a backup electrical configuration of the adapter when a failure is detected, and to control the extinction of one or more element of the power consumption electrical circuit of the aircraft controlled by the energy management system according to the backup electrical configuration,
- the switch is arranged to receive the status of the automaton and to emit controls to the switches of the power consumption electrical circuit of the aircraft controlled by the energy management system accordingly.

The invention also relates to an energy management method for an aircraft with a hybrid power source comprising at least one rechargeable electricity source and an electricity generating source, characterized in that it comprises the following operations:
a) determining, on the one hand, status data indicating a status of the elements of the power consumption electrical circuit of the aircraft controlled by the energy management method, and on the other hand power data relating to the instantaneous electrical power demanded by the aircraft and/or the charging status of the rechargeable electricity sources of the aircraft,
b) transmitting the power data of operation a) to an automaton arranged to determine a control status of the power sources, the automaton comprising at least three statuses in the group comprising:
- a buffer status in which the demanded instantaneous electrical power is lower than the capacity of the at least one electricity generating source and is supplied thereby,
- a charging status in which the demanded instantaneous electrical power is lower than the capacity of the at least one electricity generating source and is entirely supplied by the at least one electricity generating source, and wherein the one or more electricity generating source produces a surplus of power used to recharge the at least one rechargeable electricity source,
- a turbo status in which the demanded instantaneous electrical power is higher than the capacity of the at least one electricity generating source, and where the at least one rechargeable electricity source supplies the complement required to reach the demanded instantaneous electrical power,
c) determining an electrical control for the at least one rechargeable electricity source and the at least one electricity generating source according to the demanded instantaneous electrical power and the status of the automaton determined in operation b),
d) detecting from the status data the occurrence of a failure and determining a backup electrical configuration, and
e) emitting controls to the switches of the power consumption electrical circuit of the aircraft controlled by the energy management system to implement a nominal electrical configuration, or, in case of determination of a backup electrical configuration in operation d), this backup electrical configuration.

The invention also relates to a computer program comprising instructions to implement the device according to the invention or to execute the method according to the invention when said computer program is executed on a computer, and a data storage medium on which this computer program is recorded.

Other features and advantages of the invention will appear better upon reading the following description, derived from examples given for illustrative and non-limiting purposes, from the drawings wherein.

The drawings and the description hereinafter contain, essentially, elements of certain nature. Hence, they could be used not only to better understand the present invention, but also contribute to the definition thereof, where appropriate.

The present description could involve elements that might be protected by the copyright. The owner of the rights should not have any objection to the identical reproduction of the present patent document or its description, as it appears in the official records, by anyone. For the rest, he/she completely reserves its rights.

Figure 1:
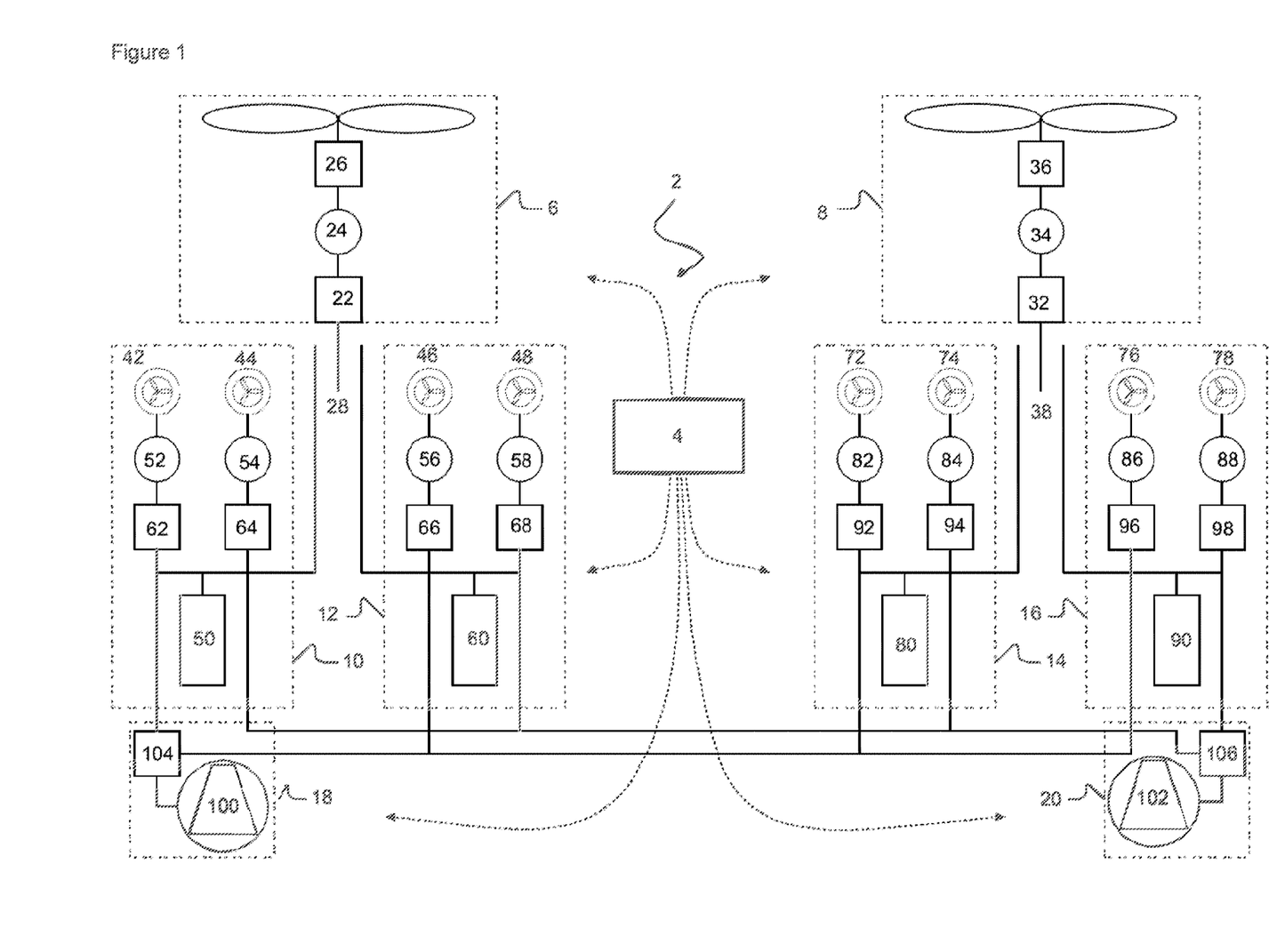
FIG. 1 represents a schematic view of the electrical architecture of a hybrid aircraft comprising an energy management system according to the invention.

As one could see in FIG. 1, an aircraft 2 according to the invention comprises an energy management system 4 according to the invention, two horizontal drive units 6 and 8, four vertical drive units 10, 12, 14 and 16, and two electricity generating sources 18 and 20.

This type of aircraft is extremely innovative and is particularly suitable for showing the potential of the energy management system 4. However, the aircraft could have a simpler architecture, for example one single horizontal drive unit, one or two vertical drive unit(s) and one single electricity generating source. Still alternatively, the aircraft could be other than a VTOL type one, but of another type, for example a "conventional" hybrid aircraft.

In the example described herein, the horizontal drive unit 6 (respectively 8) comprises a DC to AC converter 22 (respectively 32), an electric motor 24 (respectively 34) and a propulsion unit 26 (respectively 36), for example with a propeller-type one. The propulsion unit 26 (respectively 36) is arranged to enable the aircraft to advance in a substantially horizontal direction. In the example described herein, the propulsion unit 26 (respectively 36) consumes a power of 80 kW in the flight regime.

The horizontal drive unit 6 (respectively 8) is connected at the input to a switch 28 (respectively 38) which allows connecting this input to the output of the vertical drive unit 10 (respectively 14) or 12 (respectively 16), as described hereinbelow.

The vertical drive unit 10 (respectively 12, 14, 16) comprises a rotor 42 (respectively 46, 72, 76) driven by a motor 52 (respectively 56, 8, 86), a rotor 44 (respectively 48, 74, 78) driven by a motor 54 (respectively 58, 84, 84, 88). The motors 52 and 54 are powered by a respective DC to AC converter 62 and 64 (respectively 66 and 68, 92 and 94, 96 and 98). The DC to AC converters 62 and 64 (respectively 66 and 68, 92 and 94, 96 and 98) are connected to an electrical bus of the vertical drive unit 10 (respectively 12, 14, 16), to which a battery 50 (respectively 60, 80, 90) is connected as well as an input connected to an electrical distribution bus of the electricity generating source 18, an input connected to an electrical distribution bus of the electricity generating source 20. Finally, the electrical bus of each of the vertical drive units 10 and 12 (respectively 14 and 16) is connected to a respective output of these, which is connected to the switch 28 (respectively 38). As will be seen below, the batteries 50, 60, 80 and 90 together deliver 600 kW when they deliver 100% of their capacity.

In the example described herein, each electricity generating source 18 (respectively 20) comprises, on the one hand, a turbine generator 100 (respectively 102) and an AC to DC converter 104 (respectively 106). In the example described herein, each turbine generator can deliver 40 kW at 100% of its capacity. Alternatively, the electricity generating sources could consist of other DC or AC electricity production sources, followed by an AC to DC converter or a DC to DC converter. Thus, these sources could be based on turbogenerators powered by conventional fuel, biofuel, or synthetic fuels. Still alternatively, a hydrogen-based power source, like a fuel cell, could be used.

Figure 2:
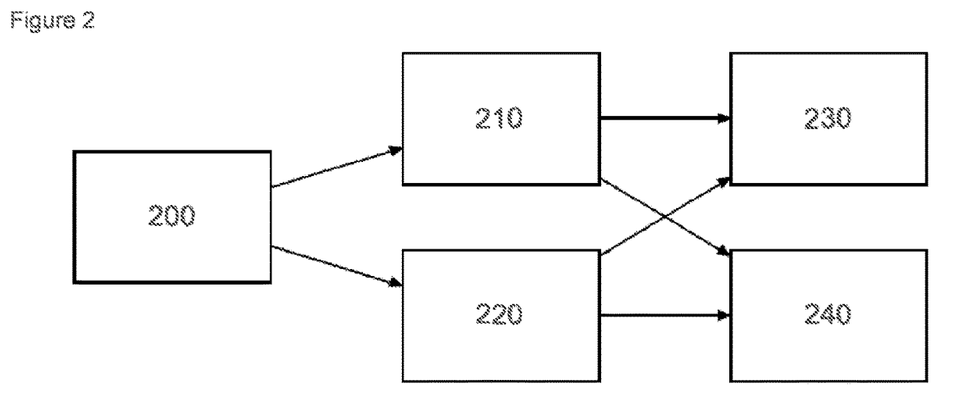
FIG. 2 shows a generic diagram of the energy management system of FIG. 1.

As will be seen in FIG. 2, the energy management system 4 is arranged to control, on the one hand, the electricity generating sources 18 and 20, on the other hand the switches 28 and 38, but also as well as various protection elements not shown in FIG. 1.

When analyzing FIG. 1, it appears that all motor and electric elements are duplicated. Thus, one-fail-safe can be ensured. Indeed, there are two horizontal drive units, four vertical drive units themselves forming two sub-units connected to the same horizontal drive unit, and two electricity generating sources.

Beyond this rather conventional duplication, the electrical buses specific to each vertical drive unit, as well as the electrical distribution bus specific to each electricity generating source which allow reaching this objective.

Indeed, as will be seen hereinbelow, the particular structure of the aircraft of FIG. 1 allows having a real hybridization of the electrical power sources, in contrast with existing solutions in which it consists of a mere juxtaposition. Thus, depending on the power requirements, both the batteries and the electricity generating sources can operate in concert. Yet, beyond this, this architecture allows considering the batteries as pure "energy buffers". The batteries are treated in a totally passive manner, without any need for software or hardware intelligence other than the basic intelligence required to operate the battery system by itself BMS (Battery Management System), for example to activate the protections and to raise the status. This goes completely against all existing solutions, in which either an element is specifically designed to optimize the operation of the batteries, and serves as a control, or an element is provided to compensate for a possible weakness of the batteries, but in exclusive alternation, i.e. without the batteries and this element being capable of operating simultaneously.

FIG. 2 shows a schematic diagram of the energy management system 4 of FIG. 1. As shown in this figure, the energy management system 4 comprises a detector 200, an automaton 210, an adapter 220, a controller 230 and a switch 240.

The detector 200 is a system arranged to receive various data of the aircraft 2, which it will optionally process and transmit totally or partly on the one hand to the automaton 210, and on the other hand to the adapter 220.

Thus, the data that the detector 200 receives are of two main types:
- on the one hand, status data indicating a status (load level, temperature, limit, operating status, failure status, etc.) of the elements of the power consumption electrical circuit of the aircraft controlled by the energy management system 4, and
- on the other hand, power data relating to the instantaneous electrical power demanded by the motors 52, 54, 56, 58, 82, 84, 86, 88 of the rotors 42, 44, 46, 48, 72, 74, 76, 78 and/or the motors 24 and 34 of the propulsion units 26 and 36, and/or the charging status of the rechargeable electricity sources of the aircraft 50, 60, 80 and 90.

Thus, the detector 200 has an overall view of the functional status of the elements related to the electrical power consumption, i.e. on the one hand the presence of a failure or not as well as the flight phase of the aircraft 2, but also of the energy status of these elements, i.e. their instantaneous status as well as the instantaneous electrical power demand related to the flight of the aircraft 2, as determined in response to the controls of the FMS.

Next, the expression "demanded instantaneous electrical power" will always refer to the electrical power that is demanded by the motors 52, 54, 56, 58, 82, 84, 86, 88 of the rotors 42, 44, 46, 48, 72, 74, 76, 78 and/or the motors 24 and 34 of the propulsion units 26 and 36, except if another definition is explicitly mentioned.

Figure 3:
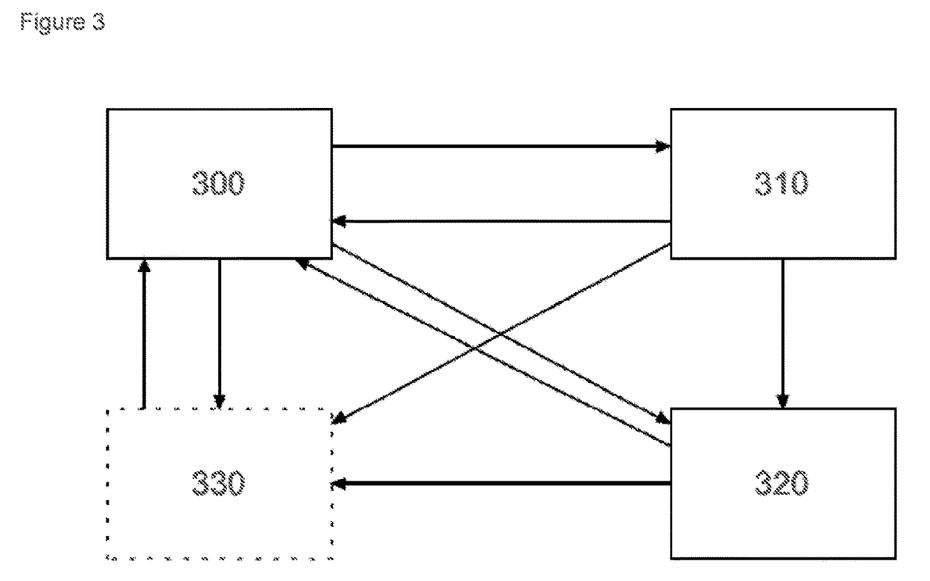
FIG. 3 shows a schematic diagram of the statuses of the automaton of FIG. 2, as well as the transitions between these.

In the example described herein, the automaton 210 is a finite automaton, an embodiment of which is shown in FIG. 3. As one could see in this figure, the automaton 210 has four possible statuses:
- a so-called "buffer" status 300, in which the demanded instantaneous electrical power is lower than the capacity of the at least one electricity generating source 18 and 20, and is supplied by these,
- a so-called "charging" status 310, in which the demanded instantaneous electrical power is lower than the capacity of the at least one electricity generating source and is entirely supplied by the at least one electricity generating source, and in which the at least one electricity generating source produces a surplus of power used to recharge the at least one rechargeable electricity source,
- a so-called "turbo" status 320, in which the demanded instantaneous electrical power is higher than the capacity of the at least one electricity generating source, and where the at least one rechargeable electricity source supply the complement necessary to reach the demanded instantaneous electrical power, and
- an optional so-called "silent" status 330, in which the electrical power sources 18 and 20 are intentionally stopped in order to reduce sound emissions, which also allows reducing the emission of pollutants.

The automaton 210 presents transitions that are intended to ensure:
- on the one hand, a minimum risk in the determination of the status transitions, in order to limit the risks of failure related to the automaton 210 (and therefore to the energy management system 4),
- on the other hand, a recharging of the batteries 50, 60, 80, 90 as frequently as possible.

For this reason, the status transitions are based on two variables:
- the demanded instantaneous electrical power,
- the recharging rate of the batteries 50, 60, 80, 90.

As a priority, as soon as the demanded instantaneous electrical power exceeds the electrical power capacity of the electricity generating sources 18 and 20, the buffer status or the charging status switches into the turbo status. Indeed, in this case, it is essential to simultaneously operate the batteries 50, 60, 80, 90 and the electricity generating sources 18 and 20 in order to supply enough electrical power to implement the flight controls.

On a secondary basis, when the demanded instantaneous electrical power is lower than the electrical power capacity of the electricity generating sources 18 and 20, the priority is to recharge the batteries.

Thus, the automaton 210 can transition from the buffer status into the charging status or into the turbo status, and from the charging status into the turbo status, and it can transition from the charging status into the buffer status or from the turbo status into the buffer status. However, it cannot transition from the turbo status into the charging status: it should first transition into the buffer status.

The reason for this is that, in this manner, each status transition is conditioned by one single change in condition relating either to the demanded instantaneous electrical power, or to the charging status of the batteries. Thus, the reliability of the automaton 210 is improved because the risks of several successive transitions or non-transitions are minimum.

In addition, since the automaton 210 refreshes its status at a frequency of about 250 Hz, it is possible to switch from the turbo status into the charging status throughout the buffer status almost instantaneously. Alternatively, this frequency could for example be comprised between 50 Hz and 2 kHz.

In turn, the silent status 330 is an option to the extent that it depends on a manual activation by the pilot of the aircraft 2. Thus, the latter sends a control to turn off the electricity generating sources 18 and 20 which makes any status transition into the silent status. In the same manner as for the charging and turbo statuses, when this control is deactivated, the automaton 210 transitions again into the buffer status.

Thus, the buffer status consists of a startup status and a base status in that it allows making the operation of the automaton 210 more reliable. It should be noted that the parameters defining the transitions could be varied. Thus, the transition from the buffer status into the charging status may be conditioned by a charging threshold of the batteries 50, 60, 80, 90, and this threshold could itself be modified according to the operational status and/or the flight program of the aircraft 2. Similarly, the electrical power capacity of the electricity generating sources 18 and 20 may be modified according to the operational status, the functional status and/or the flight program of the aircraft 2. For example, in some cases of failure, it may be necessary to operate one or more of the electricity generating sources 18 and 20 at a capacity higher than their rated capacity, for example 120%. The threshold for transition into the turbo status should then be adapted accordingly. This adaptation is carried out in the example described herein by the adapter 220 which adapts the transition threshold, and by the controller 230 which sends this information to the control board of the electricity generating source (respectively to the control boards of the electricity generating sources).

Still alternatively, switching into the silent status could be not purely manual, but take the environment of the aircraft 2 into account, for example take one or more parameters amongst the flight height and a geographical location into account.

The adapter 220 is arranged to receive the status data from the detector 200. On this basis, the adapter 220 can determine a failure status and a corresponding backup electrical configuration. For example, if the status data received from the detector 200 indicates that the motor 52 is faulty, then the adapter 220 determines that the vertical drive unit 10 is to be isolated, and it returns an electrical configuration indicating the need for this isolation and to turn off the elements it comprises.

Thus, the adapter 220 contains a table of all possible failure configurations, and the backup electrical configuration corresponding to each one. Similarly, if the adapter 220 determines that there is no failure, then it can return a nominal electrical configuration which may for example take the flight phase of the aircraft 2 into account. The fact that the adapter 220 contains a table with all possible failure configurations aims to guarantee any error. Alternatively, the adapter 220 could operate based on logical operations in order to determine the backup electrical configuration.

In practice, the electrical configuration, whether it is a nominal or backup one, reflects the fact that isolation switches and/or turn off controls should be activated. Indeed, each element of the circuit of FIG. 1 is connected to the rest of the circuit by a switch (not shown), and the consumers and the energy producers are further controlled upon turning on or upon turning off.

Figure 4:
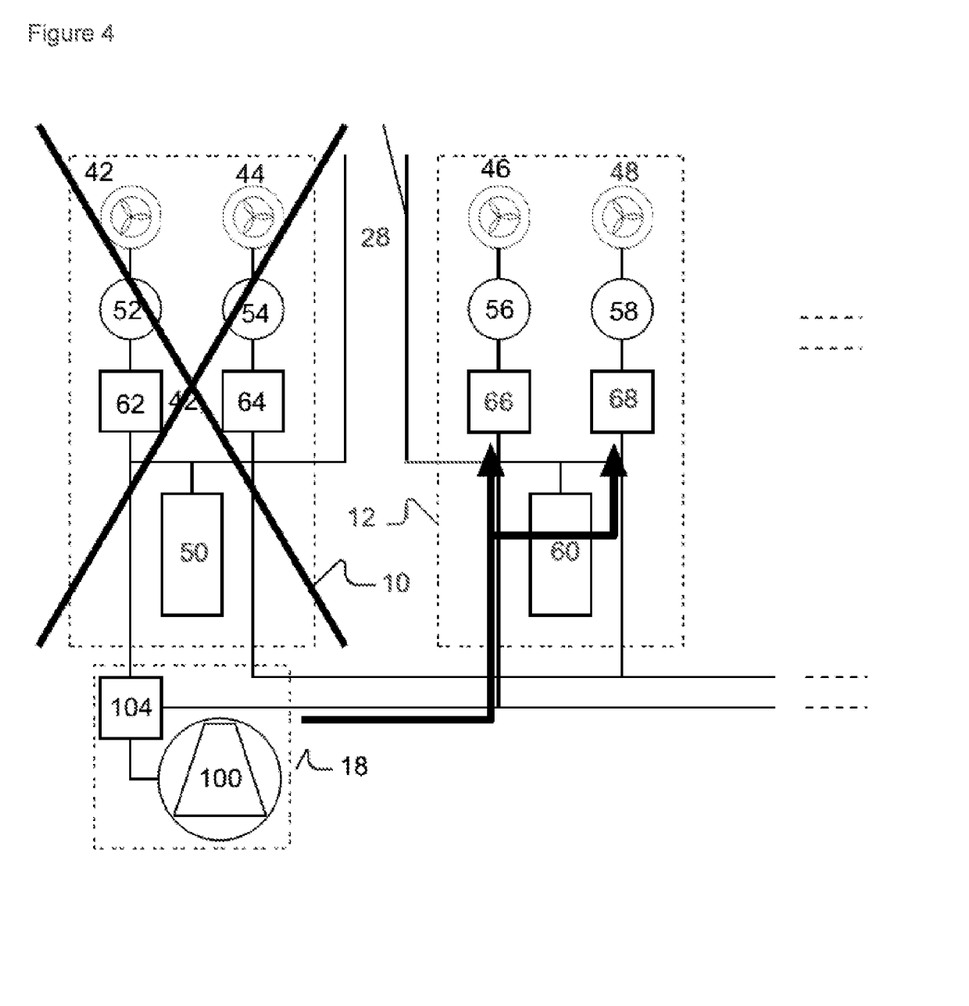
FIG. 4 shows a diagram explaining the order of the controls (from the pilot of the aircraft up to the energy management system) and their respective effect.

Returning back to the example of the failure of the motor 52, then the adapter 220 determines a backup electrical configuration which isolates the vertical drive unit 10 as shown in FIG. 4. This results in a backup electrical configuration which indicates that all of the switches within the vertical drive unit 10, i.e. the switch between the AC to DC converter 104 and the input of the vertical drive unit 10 connected to the DC to AC converter 62, the switch between the AC to DC converter 106 and the input of the vertical drive unit 10 connected to the DC to AC converter 64, the switch between the battery 50 and the rest of the vertical drive unit 10, and a control to turn off the motors 52 and 54. This backup electrical configuration also indicates that all of the switches within the vertical drive unit 12 should be activated to switch the power to this unit, as well as the switch 28 that should switch to the vertical drive unit 12.

The controller 230 receives on the one hand the status of the automaton 210, and on the other hand the electrical configuration of the adapter 220. On this basis, the controller 230 may control the rechargeable electricity sources 50, 60, 80 and 90 and/or the electricity generating sources 18 and 20 according to the energy regime corresponding to the status of the automaton 210 and extinction information indicated by the electrical configuration of the adapter 220.

For example:
in the takeoff phase, with the activated silent status, the controller 230 sends a control to turn off the electricity generating sources 18 and 20. By turn off, it should be understood that the controller 230 emits a control for electrical disconnection of the considered elements of the electrical system. In practice, this control may be result in a so-called super-idle regime where the considered power sources rotate at a hyper-idle regime, which avoids turning them off for safety reasons (risk of restart problem).

Still alternatively, this extinction may result in an electrical turn off in the literal sense of the word,
in the takeoff phase, with the charging status, the controller 230 sends a control to increase the power of the electricity generating sources 18 and 20 to lower the power emitted by the batteries 50, 60, 80 and 90 down to 0,
in the takeoff phase, with the turbo status, the controller 230 sends a control to increase the power of the electricity generating sources 18 and 20 to their maximum capacity,
in the cruise flight phase, with the charging status, the controller 230 sends a control to increase the power of the electricity generating sources 18 and 20 until the power emitted by the batteries 50, 60, 80 and 90 is equal to the inverse of the recharging power indicated by the BMS (i.e. in practice the batteries receive this recharging power),
in the cruise flight phase, with the buffer status, the controller 230 sends a control to increase the power of the electricity generating sources 18 and 20 in order to lower the power emitted by the batteries 50, 60, 80 and 90 down to 0,
in the descent phase, with the buffer status, the controller 230 sends a control to increase the power of the electricity generating sources 18 and 20 in order to lower the power emitted by the batteries 50, 60, 80 and 90 down to 0,
in the landing phase, with the buffer status, the controller 230 sends a control to increase the power of the electricity generating sources 18 and 20 in order to lower the power emitted by the batteries 50, 60, 80 and 90 down to 0,
in the landing phase, with the turbo status, the controller 230 sends a control to increase the power of the electricity generating sources 18 and 20 to their maximum capacity, etc.

Finally, the switch 240 is arranged to perform an AND-type binary operation between, on the one hand, the configuration emitted by the adapter 220, and on the other hand by the electrical configuration induced by the status of the automaton 210. Thus, returning back to the example of the failure of the motor 52, while the status of the automaton 210 is the turbo status, then, for the switches of the vertical drive unit 10, this operation will be 0 (resulting from the isolation ordered by the backup electrical configuration emitted by the adapter 220)×1 (resulting from the turbo status) which will return to 0 for these switches. Once the statuses of all of the switches of the circuit are determined by the switch 240, the corresponding controls are sent to all of the switches of the circuit, and the loop from the detector 200 could be resumed.

Thus, it appears that:
all of the elements of the circuit consuming or producing power are connected to the detector 200 to indicate their status thereto,
all of the elements of the circuit that supply power are controlled by the controller 230,
all of the switches and on/off controls are controlled by the switch 240.

Thus, the energy management system of the invention completely separates the management of the power production mode (via the automaton 210) and the management of the electrical configuration of the circuit to consume this power (via the adapter 220). The controller 230 and the switch 240 are elements of intentionally simplified nature so that each receives the outputs of the automaton 210 and of the adapter 220 and is able to take these outputs into account to control respectively the power suppliers and the switches.

This decorrelation of the control of the electrical circuit is particularly innovative and advantageous in that it sets out an architecture that can be deployed quickly and reliably on all types of hybrid aircraft, regardless of the redundancy of their design.

Alternatively, the controller 230 could be arranged to receive data only from the automaton 210, and the switch 240 to receive data only from the adapter 220.

Figure 5:
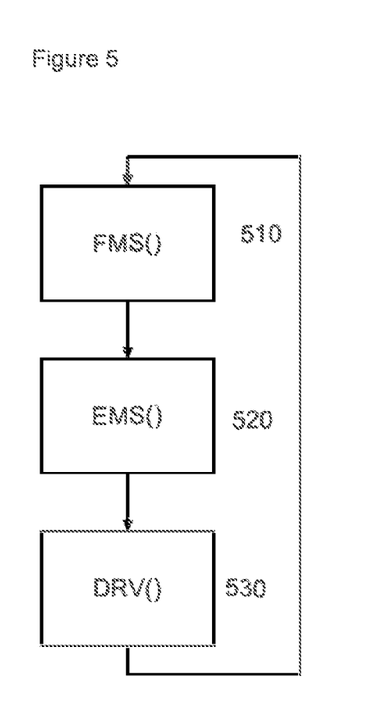
FIG. 5 shows a generic control loop of an aircraft implementing the device according to the invention.

FIG. 5 shows a very high-level operation flowchart of the architecture of an aircraft in which the energy management system according to the invention is implemented. Thus, a control loop of the aircraft takes place continuously, wherein the FMS receives controls from the cockpit and the pilot assistance elements via a function FMS( ) in an operation 500.

Afterwards, in an operation 510, the data generated by the function FMS( ) propagate to the energy management system according to the invention via an function EMS( ) in which the system according to the invention described hereinabove is implemented. Finally, in an operation 520, the controls emitted by the controller 230 are implemented, by a function DRV( ) which controls the individual elements. And the loop resumes with the operation 500.

It goes without saying that this loop is simplified compared to the actual operation of the aircraft, interruptions possibly taking place in case of detection of a failure or for other reasons requiring a feedback form. The purpose is to disclose at which level of the hardware architecture the invention is located, an FMS cannot be considered as an EMS, nor a reactor controller as an EMS on its own.

The invention claimed is:

1. An energy management system for an aircraft with a hybrid power source comprising at least one rechargeable electricity source and at least one electricity generating source, the energy management system comprising:
- a detector configured to determine, on the one hand, status data indicating a status of elements of a power consumption electrical circuit of an aircraft controlled by the energy management system, and on the other hand power data relating to (i) an instantaneous electrical power demanded by the aircraft and/or (ii) a charging status of rechargeable electricity sources of the aircraft,
- an automaton configured to receive the power data from the detector and to determine a control status of the power sources, the automaton comprising at least three statuses in the group comprising:
  - a buffer status in which a demanded instantaneous electrical power is lower than a capacity of the at least one electricity generating source and is supplied thereby,
  - a charging status in which the demanded instantaneous electrical power is lower than the capacity of the at least one electricity generating source and is entirely supplied by the at least one electricity generating source, and wherein the one or more electricity generating source produces a surplus of power used to recharge the at least one rechargeable electricity source,
  - a turbo status in which the demanded instantaneous electrical power is higher than the capacity of the at least one electricity generating source, and wherein the at least one rechargeable electricity source supplies a complement required to reach the demanded instantaneous electrical power,
- an adapter configured to receive the status data and to determine a backup electrical configuration when the status data indicate a failure,
- a controller configured to receive status information of the automaton and to determine an electrical control for the at least one rechargeable electricity source and the at least one electricity generating source according to the demanded instantaneous electrical power,
- a switch configured to emit controls to the switches of the power consumption electrical circuit of the aircraft controlled by the energy management system to implement a nominal electrical configuration, or, in case of reception of a backup electrical configuration of the adapter, the backup electrical configuration,
- the controller being configured to receive the backup electrical configuration of the adapter when a failure is detected, and to control an extinction of one or more element of the power consumption electrical circuit of the aircraft controlled by the energy management system according to the backup electrical configuration.

2. The energy management system of claim 1, wherein the controller is configured to use the at least one rechargeable electricity source when the automaton is in the buffer status, during a transition during which the power delivered by the at least one electricity generating source increases up to the demanded instantaneous electrical power.

3. The energy management system according to claim 1, wherein the automaton is initialized with the buffer status, and presents the following transition rules:
- transition from the buffer status or the charging status into the turbo status when the demanded instantaneous electrical power is higher than the capacity of the at least one electricity generating source,
- transition from the turbo status into the buffer status when the demanded instantaneous electrical power is lower than the capacity of the at least one electricity generating source,
- transition from the buffer status into the charging status when the demanded instantaneous electrical power is lower than the capacity of the at least one electricity generating source and one or more rechargeable electricity source has a charging status lower than a fully-charged threshold, and
- transition from the charging status into the buffer status when the demanded instantaneous electrical power is lower than the capacity of the at least one electricity generating source and one or more rechargeable electricity source presents a charging status equal to the fully-charged threshold.

4. The energy management system according to claim 1, wherein the automaton further comprises a silent status in which the at least one electrical power source is deactivated.

5. The energy management system of claim 4, wherein the automaton further has the following transition rules:
- transition from the buffer status, charging status or turbo status into the silent status when a silent mode control is received by the detector,
- transition from the silent status into the buffer status when the silent mode control is deactivated.

6. The energy management system according to claim 1, wherein the switch is configured to receive the status of the automaton and to emit controls to the switches of the power consumption electrical circuit of the aircraft controlled by the energy management system accordingly.

* * * * *